(12) United States Patent
Lane

(10) Patent No.: US 6,569,564 B1
(45) Date of Patent: *May 27, 2003

(54) BUTTON CELL CONSTRUCTIONS AND THIN PROFILE BATTERY CONSTRUCTIONS

(75) Inventor: Richard Lane, Boise, ID (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/434,686

(22) Filed: Nov. 5, 1999

Related U.S. Application Data

(62) Division of application No. 09/047,761, filed on Mar. 24, 1998, now Pat. No. 6,113,658, which is a continuation of application No. 08/394,543, filed on Feb. 22, 1995, now Pat. No. 5,755,831.

(51) Int. Cl.[7] .............................. H01M 2/02; H01M 2/14
(52) U.S. Cl. ........................ 429/164; 429/129; 429/179; 429/162; 429/130
(58) Field of Search ..................... 429/129, 130, 429/164, 163, 186, 131, 133, 178, 179, 176, 175, 162, 247, 174

(56) References Cited

U.S. PATENT DOCUMENTS

| | | | |
|---|---|---|---|
| 2,836,643 A | 5/1958 | Sindel | |
| 2,847,495 A | 8/1958 | Nagorski | |
| 3,884,723 A | 5/1975 | Wuttke | |
| 4,070,528 A | 1/1978 | Bergum et al. | |
| 4,121,021 A | 10/1978 | Ogawa et al. | |
| 4,209,574 A * | 6/1980 | Ruetschi | 429/133 |
| 4,224,387 A | 9/1980 | Nakayama | |
| 4,260,668 A | 4/1981 | Lecerf et al. | 429/194 |
| 4,579,792 A | 4/1986 | Bruder | |
| 4,816,354 A | 3/1989 | Tamminen | |
| 5,139,901 A | 8/1992 | Kawaguchi et al. | |
| 5,187,033 A | 2/1993 | Koshiba | |
| 5,288,565 A | 2/1994 | Gruenstern | |
| 5,432,027 A * | 7/1995 | Tuttle et al. | 429/127 |
| 5,486,431 A | 1/1996 | Tuttle et al. | |
| 5,490,320 A | 2/1996 | Hasegawa et al. | |
| 5,521,027 A | 5/1996 | Okuno et al. | |
| 5,525,443 A | 6/1996 | Okuno et al. | |
| 5,545,468 A * | 8/1996 | Koshiba et al. | 429/218 |
| 5,591,545 A | 1/1997 | Miyashita et al. | |
| 5,755,831 A | 5/1998 | Lane | |
| 5,804,333 A * | 9/1998 | Shioda et al. | 429/128 |
| 6,027,829 A * | 2/2000 | Tuttle | 429/157 |

* cited by examiner

Primary Examiner—Stephen Kalafut
Assistant Examiner—Raymond Alejandro
(74) Attorney, Agent, or Firm—Wells St. John P.S.

(57) ABSTRACT

A method of forming a button-type battery includes, a) providing a conductive first terminal housing member, a conductive second terminal housing member, an anode, and a cathode; b) providing an anode/cathode separator, the separator being pre-configured with a self-aligning shape for self-aligning receipt relative to one of the first or second terminal housing members or the cathode; c) positioning the pre-configured separator relative to the one of the first or second terminal housing members or cathode, the pre-configured separator shape facilitating final alignment of the separator relative to the one of the first or second terminal housing members or the cathode; and d) joining the first and second terminal housing members together into a sealed battery assembly, with the anode, cathode and separator being received within the sealed battery assembly. A button-type battery construction is also disclosed.

15 Claims, 4 Drawing Sheets

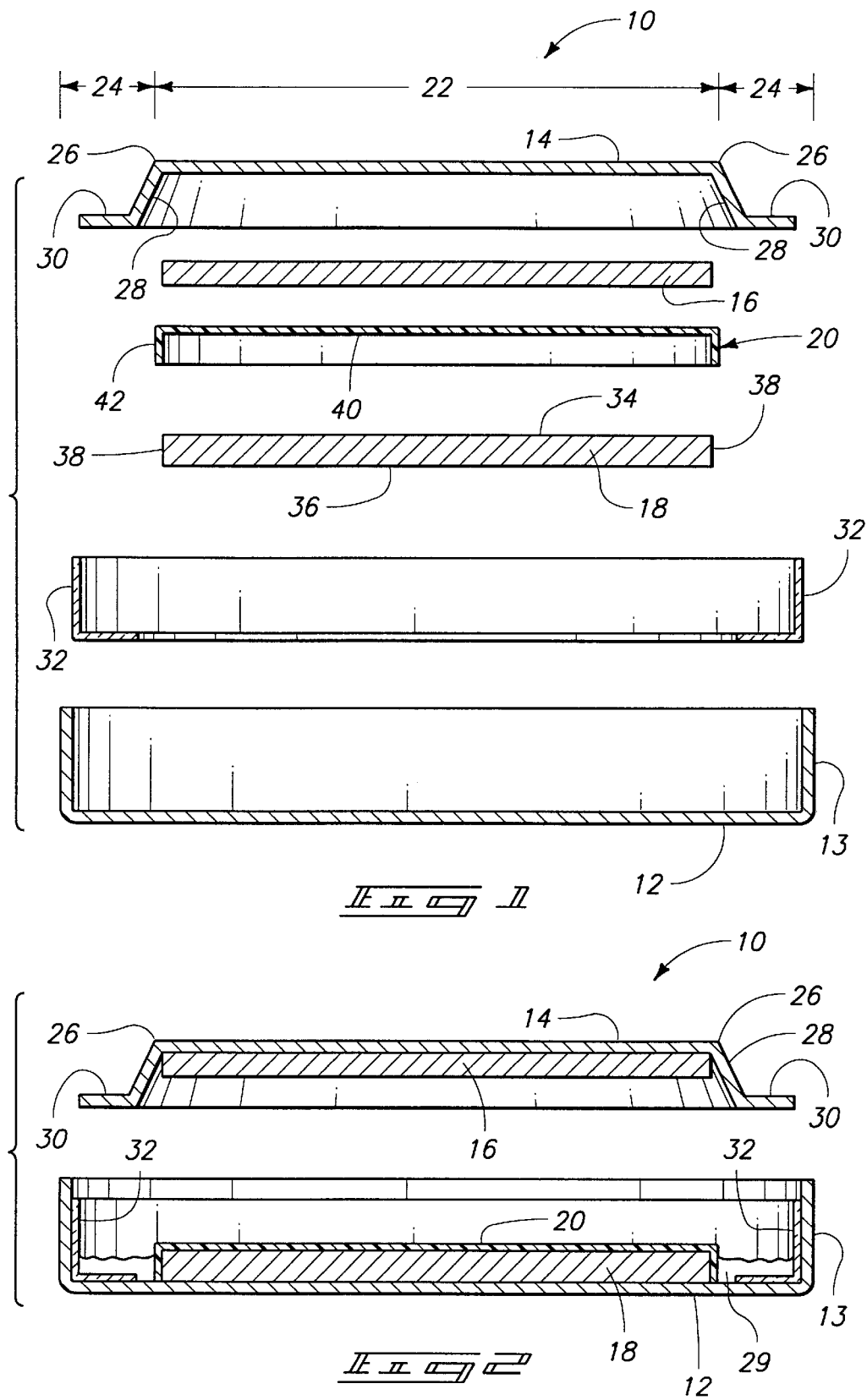

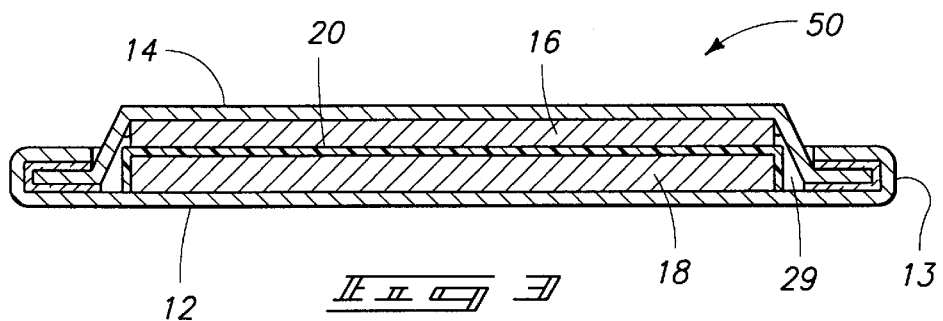
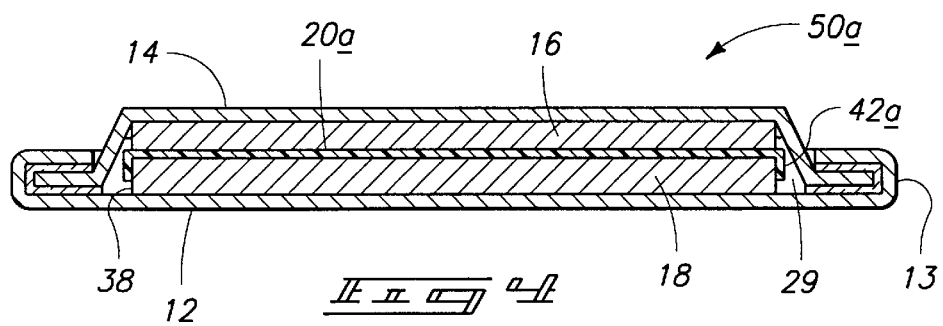
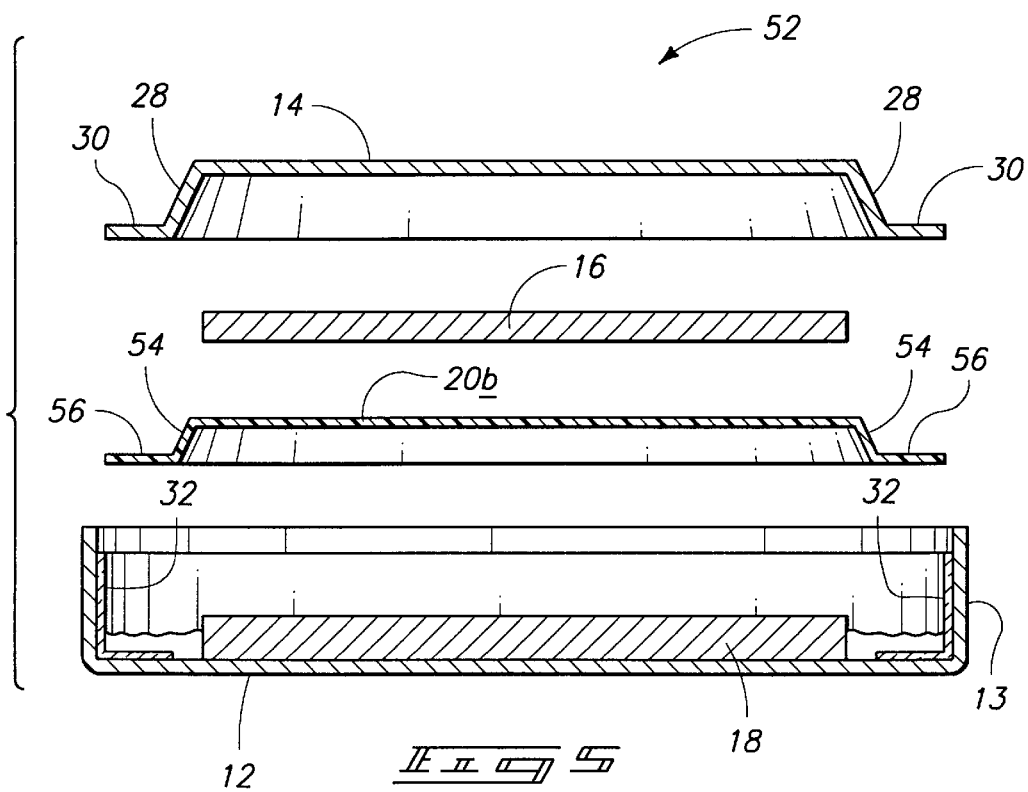

BUTTON CELL CONSTRUCTIONS AND THIN PROFILE BATTERY CONSTRUCTIONS

RELATED PATENT DATA

This divisional patent application resulted from U.S. Pat. application Ser. No. 09/047,761, filed Mar. 24, 1998, now U.S. Pat. No. 6,113,658 which is a continuation application of U.S. Pat. application Ser. No. 08/394,543, now U.S. Pat. No. 5,755,831, which was filed on Feb. 22, 1995 and issued on May 26, 1998.

TECHNICAL FIELD

This invention relates to methods of forming button-type batteries and to button-type battery constructions.

BACKGROUND OF THE INVENTION

Button-type batteries are small, thin energy cells that are commonly used in watches and other electronic devices requiring a thin profile. A conventional button-type battery includes two electrodes in the form of an anode and a cathode. These are typically separated by a porous separator. An electrolyte is present within pores of the separator.

These internal battery components are housed within a metal casing or housing formed by a lower conductive can and an upper conductive lid. A common prior art material for the can and lid is stainless steel. The can is typically in electrical contact with the cathode to form the positive battery terminal, and the lid is in electrical contact with the anode to form the negative battery terminal. The can and lid are crimped or pressed together to form a fluid-tight seal which entirely encloses the anode, cathode, separator, and electrolyte. An electrically insulating sealing gasket is provided within the primary seal between the lid and can to electrically isolate the two housing members.

This invention principally concerns the provision of the separator relative to the cathode and the anode, and the separator final shape and orientation relative to a final sealed battery assembly.

BRIEF DESCRIPTION OF THE DRAWINGS

Preferred embodiments of the invention are described below with reference to the following accompanying drawings.

FIG. 1 is an exploded cross-sectional view of button-type battery components illustrative of a method of forming a button-type battery in accordance with an aspect of the invention.

FIG. 2 is a fragmentary sectional view of button-type battery components in position in a method of forming a button-type battery in accordance with the invention.

FIG. 3 is a view of the FIG. 2 battery components at a point in time subsequent to the processing step illustrated by FIG. 2.

FIG. 4 is an alternate embodiment of the FIG. 3 construction in accordance with the invention.

FIG. 5 is a cross-sectional view of alternate embodiment button-type battery components illustrative of an alternate method of forming a button-type battery in accordance with an aspect of the invention.

DETAILED DESCRIPTION OF THE PREFERRED EMBODIMENTS

Figure 6:
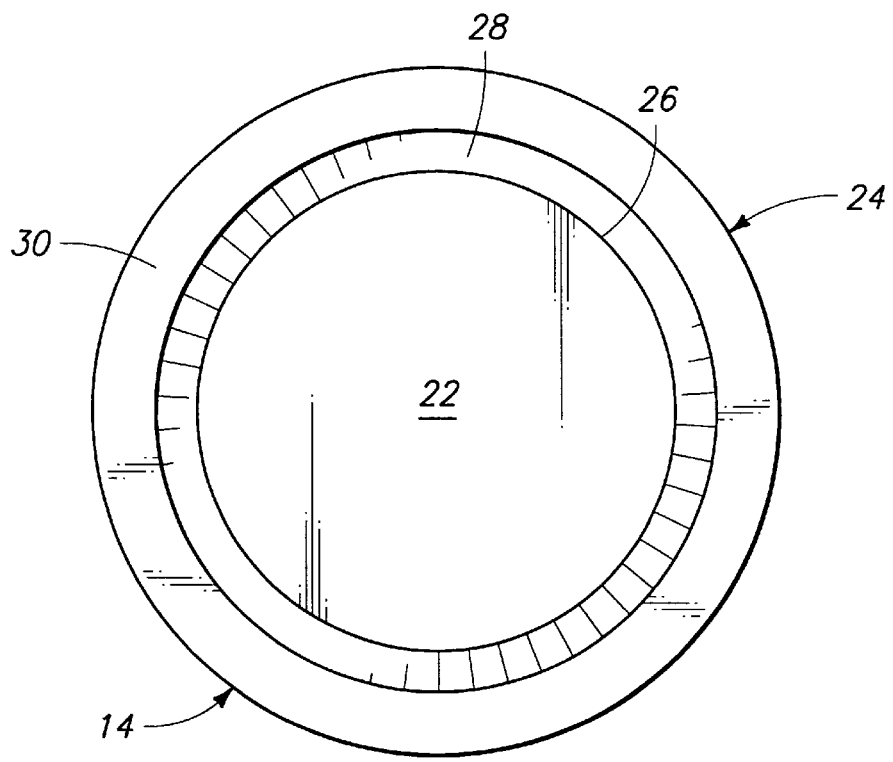
FIG. 6 is a top view of a lid or second battery terminal housing member component of the FIG. 5 assembly.

This disclosure of the invention is submitted in furtherance of the constitutional purposes of the U.S. Patent Laws "to promote the progress of science and useful arts" (Article 1, Section 8).

This invention concerns "coin" or "button-type" batteries also referred to as "button cells", and their components. A button-type battery is typically a small, circular-shaped energy cell approximately the size of a small coin. The button-type battery can be constructed in different sizes, with typical diameters being 12 mm, 16 mm, and 20 mm. Other shapes are possible, but the circular shape is most common.

In accordance with one aspect of the invention, a method of forming a button-type battery comprises the following steps:

providing a conductive first terminal housing member, a conductive second terminal housing member, an anode, and a cathode;

providing an anode/cathode separator, the separator being pre-configured with a self-aligning shape for self-aligning receipt relative to one of the first or second terminal housing members or the cathode;

positioning the pre-configured separator relative to the one of the first or second terminal housing members or cathode, the pre-configured separator shape facilitating final alignment of the separator relative to the one of the first or second terminal housing members or the cathode; and joining the first and second terminal housing members together into a sealed battery assembly, with the anode, cathode and separator being received within the sealed battery assembly.

In accordance with another aspect of the invention, a method of forming a button-type battery comprises the following steps:

providing a conductive first terminal housing member, a conductive second terminal housing member, an anode, and a cathode; the cathode having opposing outer surfaces and sidewall edges interconnecting the opposing outer surfaces;

providing an anode/cathode separator, the separator being pre-configured with a self-aligning shape for self-aligning receipt about one of the opposing cathode outer surfaces and about the cathode sidewall edges;

positioning the pre-configured separator against the cathode, the pre-configured separator shape facilitating final alignment of the separator relative to the cathode with the separator shape providing the separator against one of the cathode opposing outer surfaces and against the cathode sidewall edges; and joining the first and second terminal housing members together into a sealed battery assembly, with the anode, cathode and separator being received within the sealed battery assembly.

In accordance with still another aspect of the invention, a button-type battery comprises:

an anode;

a cathode positioned adjacent to the anode, the cathode having opposing outer surfaces and sidewall edges interconnecting the opposing outer surfaces;

an electrolyte between the anode and the cathode;

a conductive first terminal housing member in electrical contact with one of the anode or the cathode; the first terminal housing member having a periphery;

a conductive second terminal housing member in electrical contact with the other of the anode or the cathode; the second terminal housing member having a periphery;

the first and second terminal housing members forming an enclosed housing which holds and protects the anode and the cathode;

the first and second terminal housing member peripheries being configured together to form a seal which seals the anode and the cathode within the housing formed by the first and second terminal housing members; and a separator provided between and separating the anode and the cathode, the separator having a shape and being positioned to provide the separator against one of the cathode opposing outer surfaces and against the cathode sidewall edges.

The discussion first proceeds with reference to a method of forming a button-type battery wherein the separator is provided with a pre-configured shape designed for self-aligning receipt relative to the cathode. Referring first to FIG. 1, a collection of button cell battery components for assembly is indicated generally with reference numeral 10. Such comprises in principal part, a conductive first terminal housing member 12, a conductive second terminal housing member 14, an anode 16, a cathode 18, and a porous anode/cathode separator 20.

The discussion proceeds with a more detailed description of second terminal housing member 14. Reference is principally made to FIG. 1 and FIG. 6 for such a description. FIG. 6 illustrates a top view of an alternate preferred embodiment button cell assembly, with the preferred alternate having the same identical second terminal housing member construction.

Second terminal housing member 14 comprises a circular central portion 22 and an annular surrounding peripheral portion 24. Peripheral portion 24 angles away from central portion 22 at a continuous circle, peripheral angle 26. Peripheral portion 24 includes an angling section 28 which joins with central portion 22, and a flat annular ring portion 30 which joins with and angles from angling section 28 in a horizontal orientation, as shown. An example preferred material of construction for second terminal housing member 14 is 304 stainless steel.

First terminal housing member 12 is shown as a conventional button-type can, with an example preferred material of construction being 304 stainless steel. Member 12 includes a periphery 13 in the form of a perpendicularly extending sidewall. An electrically insulative sealing gasket 32 is included, and is sized to matingly fit within the periphery of can 12. An example preferred material for gasket 32 is epoxy. Gasket 32 provides electrical insulating separation between first terminal housing member 12 and second terminal housing member 14 upon sealing engagement, as will be apparent from the continuing discussion.

Anode 16 is typically sized and shaped to correspond in size and shape to central portion 22 of second terminal housing member 14, and is applied and adhered thereto by any suitable means (FIG. 2). Thus, conductive second terminal housing member 14 is in electrical contact with anode 16. An example of preferred material construction for anode 16 is elemental lithium, which is extremely tacky and self-adheres to stainless steel.

Cathode 18 is also typically of the same size and shape as anode 16, and is provided against first terminal housing member 12. Thus, conductive first terminal housing member 12 is in electrical contact with cathode 18. For purposes of the continuing discussion, cathode 18 has opposing circular outer surfaces 34 and 36, and sidewall edges 38 which interconnect opposing outer surfaces 34 and 36. An example of material of construction for cathode 18 is compressed manganese (IV) oxide, carbon and teflon powder.

Anode/cathode separator 20 is pre-configured (i.e., prior to assembly into a battery with other components) with a self-aligning shape for self-aligning receipt about cathode outer surface 34 and against cathode sidewall edges 38. Such is provided for by producing separator 20 with a central portion 40 and a substantially perpendicular ring portion 42 extending therefrom at the outermost peripheral edge of central portion 40. Example separator materials are polyethylene or polypropylene.

FIG. 2 illustrates positioning of pre-configured separator 20 against cathode 18, with a liquid electrolyte 29 also being received with housing member 12. The described and shown separator shape facilitates essential final alignment of separator 20 relative to cathode 18, with the separator shape providing separator 20 against cathode outer surface 34 and against cathode sidewall edges 38. Thus, the assembler can easily position separator 20 relative to the cathode, with the separator shape inherently providing self, final alignment upon installation relative to the cathode during assembly.

Referring to FIG. 3, first terminal housing member 12 and second terminal housing member 14, with the illustrated intervening components, are joined together into a finished sealed battery assembly 50. The anode, cathode and separator are received within sealed battery assembly 50. Electrolyte 29 fills the pores of the separator. The finished sealed assembly is typically accomplished by crimping the peripheries of the first and second terminal housing members together.

The above-described separator construction does protect the sidewalls of the cathode from electrical shorting relative to the anode. Further, such sidewall protection also reduces flaking of the cathode edges, thereby minimizing the chance that stray cathode pieces interfere with the battery edge crimp. Further, the extended nature and closed positioning of the separator relative to the cathode facilitates storage of additional electrolyte, thus allowing for a somewhat increased storage volume for the electrolyte thereby improving battery performance.

In the above described embodiment, separator sidewall edges 42 are provided against essentially all of cathode sidewall edges 38. FIG. 4 shows an alternate embodiment battery assembly 50a which includes separator 20a wherein separator edge 42a is sized to be received against only a portion of cathode sidewall edges 38 and not extend all the way to the floor of terminal housing member 12.

Figure 7:
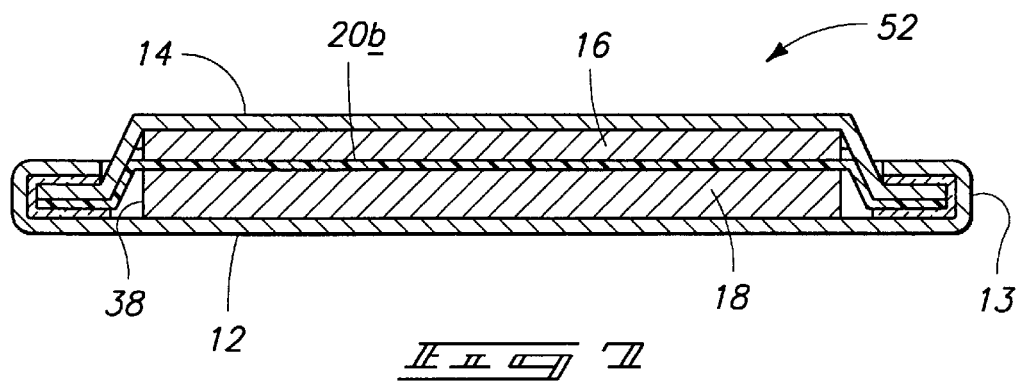
FIG. 7 is a view of the FIG. 5 battery components at a point in time subsequent to the processing step illustrated by FIG. 5.

An alternate preferred embodiment assembly 52 is shown and described with reference to FIGS. 5–7. Like numbers from the first described embodiment are utilized where appropriate, with differences in construction being indicated by addition of the suffix "b". In this embodiment, separator 20b is pre-configured with a self-aligning shape for self-aligning receipt against anode 16 and against second terminal housing member angling section 28. Specifically, anode/cathode separator 20b has a complementary male shape for receipt within the generally female shape of second terminal housing member 14 having anode 16 received therein. Thus, separator 20b comprises a central portion and a peripheral portion corresponding to that of second terminal housing member 14. The separator peripheral portion includes a separator angling section 54 which joins with the separator central portion and runs along and against second terminal housing member angling section 28 in the sealed battery assembly. The separator peripheral portion includes a separator annular ring portion 56 which joins with and angles from separator angling section 54, and runs along and against second terminal housing member annular ring portion 30.

The anode/cathode separator 20b is positioned during assembly, and is shown in FIG. 5 with the pre-configured separator shape facilitating final alignment and provision of the separator against anode 16 and against second terminal housing member angling section 28. The components are joined in a conventional manner to produce a finished battery assembly 52 (FIG. 7).

Figure 8:
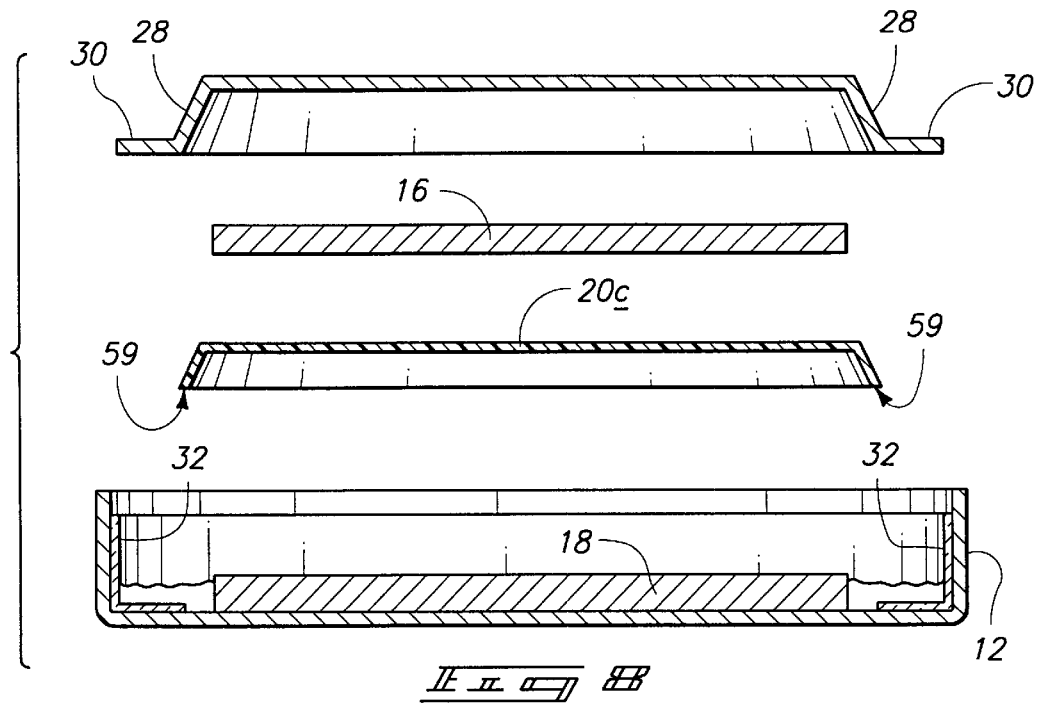
FIG. 8 is an exploded, cross-sectional view of yet further alternate embodiment button-type battery components illustrative of another alternate method of forming a button-type battery in accordance with an aspect of the invention.
Figure 9:
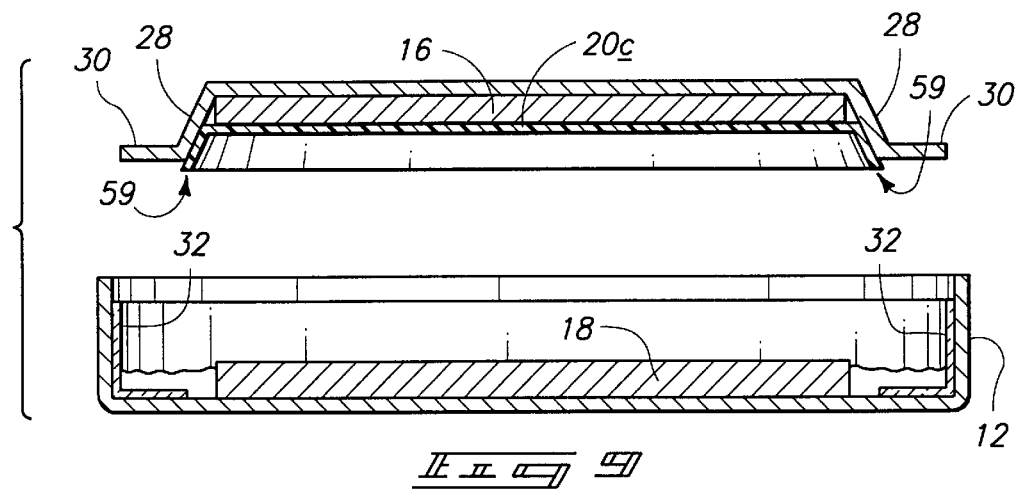
FIG. 9 is view of the FIG. 8 battery components at a point in time subsequent to the processing step illustrated by FIG. 8.
Figure 10:
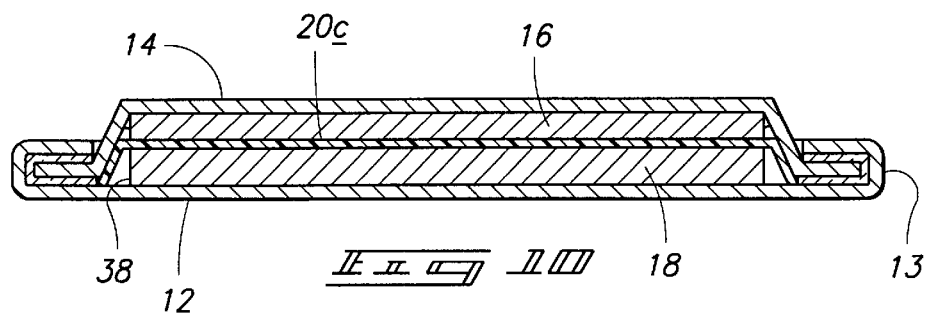
FIG. 10 is a view of the FIG. 8 battery components at a point in time subsequent to the processing step illustrated by FIG. 9.

Another alternate embodiment assembly and method is shown and described with reference to FIGS. 8–10. Like numerals are utilized from the previous embodiment, with differences being indicated by addition of the suffix "c". Here, separator 20c is configured to have an outermost peripheral terminus 59 which is positioned within the confines of second terminal housing member angling section 28, such that overlap of the separator with second terminal housing member rim portion 30 within the crimp does not occur. Such a construction still nevertheless does provide the desired self-aligning function of the separator relative to the battery components during assembly.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A button cell comprising:
   a cathode having opposing outer surfaces and a cathode sidewall edge interconnecting the opposing outer surfaces;
   a separator, the separator comprising a central portion, the central portion having a peripheral edge, the separator further comprising a ring extending from the central portion peripheral edge and terminating to form a terminal edge at a location intermediate the cathode opposing outer surfaces;
   an annular flange extending from the terminal edge of the ring; and
   a terminal housing partially enclosing the cathode and separator and having an outer peripheral portion comprising a circular flange.

2. The button cell of claim 1 wherein the ring is laterally spaced from the cathode sidewall edge.

3. The button cell of claim 1 wherein the ring is angled relative to the central portion.

4. The button cell of claim 1 wherein the peripheral edge of the central portion is elevationally above and laterally outward of the cathode sidewall edge.

5. The button cell of claim 1 wherein the terminal housing contacts the ring.

6. The button cell of claim 1 wherein the terminal housing contacts the ring, and wherein the ring is laterally spaced from the cathode sidewall edge.

7. The button cell of claim 1 further comprising electrically insulative material surrounding the annular flange.

8. The button cell of claim 1 further comprising electrically insulative material surrounding the annular flange, the electrically insulative material contacting a surface of the annular flange.

9. The button cell of claim 1 wherein the terminal housing contacts the ring and the annular flange.

10. The button cell of claim 1 wherein the terminal housing contacts the cathode, and wherein the annular flange is spaced from the terminal housing.

11. The button cell of claim 1 wherein the annular and circular flanges are substantially equal lengths.

12. The button cell of claim 1 wherein the annular flange contacts substantially an entirety of the length of the circular flange.

13. The button cell of claim 1 wherein the terminal housing comprises a ring contacting substantially an entirety of the length of the ring of the separator.

14. The button cell of claim 1 wherein the terminal housing comprises a portion contacting substantially an entirety of the length of the ring.

15. The button cell of claim 1 wherein the annular and circular flanges are parallel.

* * * * *